United States Patent [19]

Majumdar et al.

[11] Patent Number: 5,581,083
[45] Date of Patent: Dec. 3, 1996

[54] METHOD FOR FABRICATING A SENSOR ON A PROBE TIP USED FOR ATOMIC FORCE MICROSCOPY AND THE LIKE

[75] Inventors: Arunava Majumdar, Santa Barbara; Jie Lai, Ke Luo, both of Goleta, Calif.

[73] Assignee: The Regents of the University of California, Oakland, Calif.

[21] Appl. No.: 439,425

[22] Filed: May 11, 1995

[51] Int. Cl.$^6$ .................................................. H01J 37/26
[52] U.S. Cl. ........................ 250/306; 250/234; 73/105; 376/124; 376/164; 136/228
[58] Field of Search .................................. 250/306, 234; 73/105; 376/6, 124, 164; 136/228

[56] References Cited

U.S. PATENT DOCUMENTS

| | | | |
|---|---|---|---|
| 587,568 | 8/1897 | Burton . | |
| 3,723,690 | 3/1973 | Nakada et al. | 218/69 M |
| 3,974,357 | 8/1976 | Saito et al. | 219/69 M |
| 3,988,563 | 10/1976 | Swengel, Sr. et al. | 219/104 |
| 4,045,311 | 8/1977 | Matsui et al. | 204/129.55 |
| 4,069,121 | 1/1978 | Baud et al. | 204/129.3 |
| 4,278,871 | 7/1981 | Schmidt-Kufeke et al. | 219/384 |
| 4,393,292 | 7/1983 | Inoue | 219/69 M |
| 4,866,237 | 9/1989 | Inoue | 219/76.13 |
| 4,992,639 | 2/1991 | Watkins et al. | 219/69.2 |
| 5,166,520 | 11/1992 | Prater et al. | 250/306 |
| 5,281,788 | 1/1994 | Abiko et al. | 219/69.14 |
| 5,317,141 | 5/1994 | Thomas | 250/491.1 |
| 5,322,985 | 6/1994 | Ohba et al. | 219/121.54 |
| 5,354,985 | 10/1994 | Quate | 250/306 |

OTHER PUBLICATIONS

Eigler et al., "Positioning Single Atoms with a Scanning Tunneling Microscope," Nature, v 344, pp. 524–526, Apr. 5, 1990.

Mamin et al., "Atomic Emission from a Gold Scanning-Tunneling–Microscope Tip," Physical Review Letters, v 65, n 19, pp. 2418–2421, 1990.

Whitman, "Manip. of Adsorbed Atoms & Creation of New Struc. on Room–temp. Surfaces w/a Scanning Tunneling Microsope," Science, pp. 1206–1210, Mar. 1991.

Betzig et al., "Near–Field Optics: Microscopy, Spectroscopy & Surface Modif. Beyond the Diffraction Limit," Science, v 257, pp. 189–195, 1992.

Majumdar et al., "Nanometer–Scale Lithography Using the Atomic Force Microsope," Appl. Phys. Lett., v61, n19, pp. 2293–2295, 1992.

Majumder et al., "Thermal Imaging Using the Atomic Force Microscope," Appl. Phys. Lett., v 62, n20, pp. 2501–2503, 1993.

Betzig et al., "Single Molecules Observed by Near–Field Scanning Optical Microscopy," Science, v 262, pp. 1422–1425, 1993.

Lyo et al., "Field–Induced Nanometer—to Atomic Scale Manip. of Silicon Surfaces of the STM," Science, v 253, pp. 173–176.

Primary Examiner—Jack I. Berman
Attorney, Agent, or Firm—Daniel L. Dawes

[57] ABSTRACT

Nanometer holes can be reliably and repeatedly defined in the tips of cantilevered probes and used in various types of scanning microscopy by voltaicly defining the hole within a conductive layer disposed on the tip. The field strengths of the apex of the tip are sufficient to cause evaporation of the metal or conductive material from the apex onto an opposing sample substrate. The hole opens on the apex of the tip and is self-limited by the inherent threshold voltage strength required for vaporization, which voltage strength falls off rapidly from the tip. The hole may be defined in conductive layers in various combinations with oxide layers, other metal layers and semiconductor materials to define Schottky diodes, thermocouple junctions, near-field optical detectors, and atomic force tips. As a result, two or more physical interactions may be simultaneously exploited between the fabricated tip and the scanned sample from which a scanned image may be produced.

20 Claims, 5 Drawing Sheets

METHOD FOR FABRICATING A SENSOR ON A PROBE TIP USED FOR ATOMIC FORCE MICROSCOPY AND THE LIKE

This invention was made with Government support under Grant No. CTS-9215818 and CTS-9257536, awarded by the National Science Foundation. The Government has certain rights in this invention.

BACKGROUND OF THE INVENTION

1. Field of the Invention

The invention relates to the field of manufacturing nanometer probe tips, and in particular, to probe tips having sensor structures and holes defined at the tip of the probe of the order of a few nanometers for use in atomic force microscopy, scanning tunnel microscopy, near field optical sensing and related scanning technologies.

2. Description of the Prior Art

Atomic force microscopes, scanning tunneling microscopes, near field optical probes and similar nanometer type probes utilize a small, sharp needle-like probe, which is brought into close proximity with the sample surface under controlled conditions. The probe tip is sharp and is of the order of nanometers. While controlling the physical interaction between the probe tip and the scan surface, the sample is scanned by the probe, typically by moving the sample with a piezoelectric controlled stage. Deflections in the probe are typically measured through optical beam methods, namely by the deflection of an optical beam reflected off a lever to which the probe tip is attached or which is an integral part of the probe and tip. Very small movements in the beam caused by a sample-to-tip interaction are thus translated optically into distinguishable optical and electronic signals. Movement of the piezoelectric stage on which the sample is mounted is combined in a graphic computer to provide a two dimensional map of the sample-to-tip interaction, which is usually determined by one or more characteristics of the sample surface.

The interaction between the probe tip may be of any type imaginable and typically includes physical interactions which are electronic, electrostatic, mechanical, thermal, chemical, optical or magnetic in nature. Surface images containing the information regarding a particular interaction on the surface with the probe tip can be attained with an extremely high resolution. Nanometer resolution or resolution on the angstrom atomic scale are typically achieved.

Although it is desirable to image the surface using all conceivable physical interactions between the probe tip and surface, scanning probes typically are designed to utilize a single interaction, or at least are predominantly affected by a single physical interaction. Heretofore, it has been extremely difficult to build probes which have a design that can materially respond to two or more different types of physical interactions between the probe tip and sample.

Since most of the sample-to-tip interactions are near-field effects, such as in the case of electron tunneling used in scanning tunneling microscopy, it is important to be able to fabricate the sensor immediately at the end of the probe tip in order to be as close as possible to the proximity or near-field effect. In addition, the requirement for spatial resolution for scanning microscopy is typically in the nanometer range. Therefore, the sensor size must be of the same order of magnitude, that is also in the nanometer range.

Prior art attempts to define sensor areas using microphotolithography has been extremely difficult even when using high frequency or high energy radiation. First, alignment of the photolithography masks to a few nanometers to locate the sensor exactly at the probe tip ranges from very difficult to impossible. Second, microphotolithography does not have the spatial resolution capable of making controllable patterns in the range below approximately 300 nanometers. While electron beam lithography can be used below the 300 nanometer limit, the deposition of photoresists on a needle-like, nonplanar probe tip is difficult, if not impossible, because of the difficulty in controlling the thickness of the mask layer. Repeatability of mask thickness is unattainable and yields are erratic. Therefore, what is needed is some type of nanofabrication process which is repeatable controllable to provide sensor sizes and locations without these defects.

Also what is needed is a method for fabricating a probe which can be used to respond to two or more physical interactions, and which will be able to locate the sensor at the very end of the probe tip and yet still define the sensing area to be only a few nanometers in size.

BRIEF SUMMARY OF THE INVENTION

The invention is an improvement in a method for forming a sensor comprising the steps of providing a probe with a pointed tip having an apex. A first conductive layer is disposed on the probe and on the tip of the probe. The tip of the probe is disposed a predetermined distance away from a conductive substrate. A voltage pulse is applied between the conductive substrate and the first conductive layer disposed on the tip of the probe. The voltage pulse has a magnitude above a predetermined threshold voltage to thereby evaporate a portion of the first conductive layer from the apex of the tip and to define a hole in the first conductive layer at the apex of the tip. As a result, a modified probe structure usable as or in the fabrication of a sensor is reliably and repeatedly fabricated.

The step of applying the voltage to the first conductive layer comprises first applying a voltage pulse below the threshold voltage. A determination is made whether the first conductive layer has been partially evaporated onto the conductive substrate. If it has not, the magnitude of the applied voltage is increased until at least a portion of the first conductive layer on the apex of the tip is deposited on the conductive substrate. The improvement further comprises the step of terminating the application of the voltage to the first conductive layer when determination of deposition of the portion of the first conductive layer on the conductive substrate indicates that the deposition has self-limited.

In the preferred embodiment the step of disposing a first conductive layer on the probe comprises disposing a binding layer on the probe and tip, and then disposing a second conductive layer on the binding layer so that adhesion of the second conductive layer to the probe and tip through the binding layer is improved. The first conductive layer is thus comprised of the binding layer and the second conductive layer.

In another embodiment prior to disposing the first conductive layer on the probe and tip, the improvement further comprises the steps of disposing an oxide layer on the probe and tip. The hole is defined in the first conductive layer to expose a portion of the oxide layer at the apex of the tip. Thereafter the improvement further comprises selectively removing the exposed portion of the oxide layer to selectively expose a portion of the tip. The tip is comprised of a semiconductor material. A metal layer is disposed on the exposed portion of the tip to form a Schottky diode between the semiconductor material of the tip and the metal layer.

In still another embodiment the method further comprises the steps of disposing an oxide layer on the first conductive layer prior to applying the voltage to the first conductive layer to define a hole through the oxide layer and the conductive layer. A second conductive layer of a selected metal is disposed on at least an exposed portion of the first conductive layer an the oxide layer to form a thermocouple junction between the first conductive layer and second conductive layer.

In yet another embodiment the probe is comprised of an optically transmissive material and the improvement further comprises the step of providing an optical detector for receiving light through the tip of the probe through the hole defined in the first conductive layer to provide a near-field optical sensor.

In another embodiment after disposing the first conductive layer on the probe, the improvement further comprises the steps of forming an oxide layer on the probe and tip, and disposing a second conductive layer on the oxide layer and hence on that portion of the probe and tip covered thereby. A voltage is applied between the second conductive layer and the substrate thereafter to define a hole in the second conductive layer to selectively expose a portion of the oxide layer. The selected portion of the oxide layer is removed to selectively expose a portion of the first conductive layer. A metal layer is disposed at least on the selectively exposed first conductive layer to thereby define a thermocouple junction therebetween.

The improvement further comprises the steps of using the probe as a sensor both for atomic force microscopy on one hand, and on scanning thermal, near-field optical, or scanning tunneling microscopy on the other hand to generate an image from one or both types of tip-to-sample interactions.

The invention is also defined as an improvement in a sensor comprising a probe having a sharp tip with an apex and a conductive layer disposed on the probe and tip. A hole is defined in the conductive layer at the apex of the tip by self-limiting evaporation of a portion of the conductive layer at the apex at the tip. As a result, the sensor is fabricated with a high degree of uniformity and repeatability in size of the hole.

The conductive layer is comprised of a binding layer disposed on the probe and tip and a metallic layer disposed on the binding layer so that adhesion of the conductive layer to the probe is improved. For example, the binding layer is titanium and the metallic layer is a noble metal.

The probe in one embodiment is composed of semiconductive material and further comprising a metallic layer disposed in the hole in contact with exposed portion of the probe to form a Schottky diode at the apex of the tip.

In another embodiment the improvement further comprises an oxide layer disposed on the conductive layer and the hole is defined through the conductive layer and the oxide layer to selectively expose a portion of the apex of the tip. A metal layer is disposed in the hole in contact with the first conductive layer to form a thermocouple junction therebetween.

In another embodiment the improvement further comprises an oxide layer exposed beneath the conductive layer and a metal layer disposed beneath the oxide layer and the conductive layer. The hole is defined in the conductive layer and in the oxide. Thereafter the hole is refilled to reform the conductive layer therein and to form a thermocouple junction between the conductive layer and a portion of the metal layer exposed by the hole defined in the oxide layer lying between the first conductive layer and metal layer.

In yet another embodiment the probe is comprised of a material which is light transmissive so that the tip of the probe,. as selectively exposed by the hole through the conductive layer, functions as a near-field optical scanning sensor.

The invention may be better visualized by now turning to the following drawings wherein like elements are referenced by like numerals.

The invention and its various embodiments can now be understood by turning to the following description of the detailed embodiments.

DETAILED DESCRIPTION OF THE PREFERRED EMBODIMENTS

Nanometer holes can be reliably and repeatedly defined in the tips of cantilevered probes and used in various types of scanning microscopy by voltaicly defining the hole within a conductive layer disposed on the tip. The field strengths of the apex of the tip are sufficient to cause evaporation of the metal or conductive material from the apex onto an opposing sample substrate. The hole opens on the apex of the tip and is self-limited by the inherent threshold voltage strength required for vaporization, which voltage strength falls off rapidly from the tip. The hole may be defined in conductive layers in various combinations with oxide layers, other metal layers and semiconductor materials to define Schottky diodes, thermocouple junctions, near-field optical detectors, and atomic force tips. As a result, two or more physical interactions may be simultaneously exploited between the fabricated tip and the scanned sample from which a scanned image may be produced.

Figure 3:
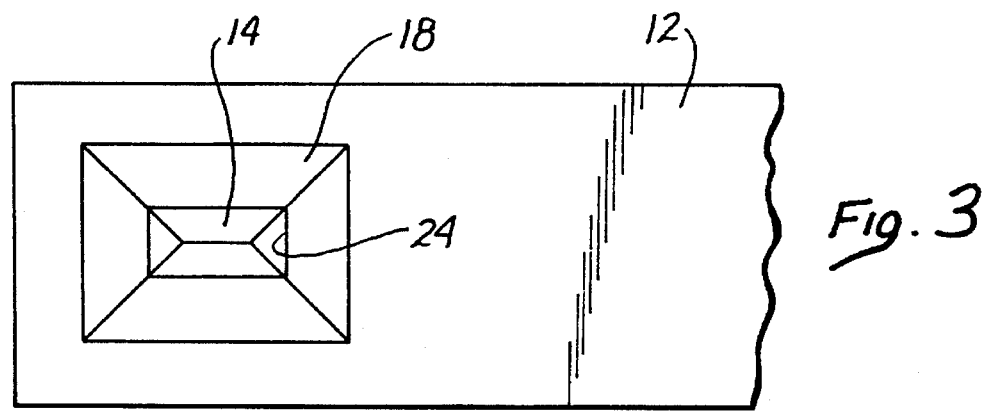
FIG. 3 is the top plan view of a probe tip fabricated according to the methodology described in connection with FIGS. 1 and 2.

The nanofabrication process of the invention includes as a basic step the opening of a nanometer-scale hole and a conducting film. A top plan view of probe 10 is shown in FIG. 3 wherein hole 24 is defined in conducting film 18 and is generally rectangular as defined by the geometry of triangular faces pyramidal tip 14. The process for forming hole 24 is determined by the distance between substrate 20 and tip 14 as shown in FIG. 1, the voltage applied between the two and the shape of tip 14.

Figure 1:
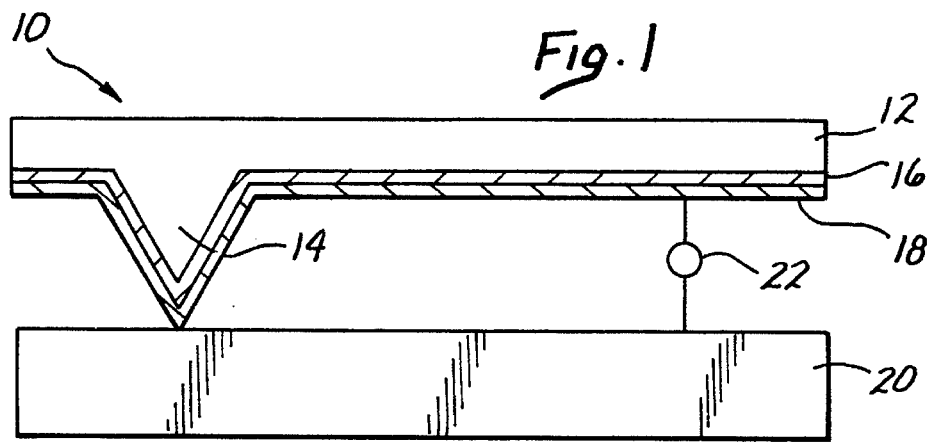
FIG. 1 is a simplified diagrammatic side cross-sectional view of a cantilever probe as used in atomic force microscopy.

This conducting film, which may be metallic or semiconducting, is first deposited on a sharp probe tip 14 as shown in FIG. 1. The probe, generally denoted by reference numeral 10, is comprised of a cantilever beam 12 and a probe tip 14. The probe, however, need not be in the shape of a cantilever beam and can be fashioned in the form of a sharp needle like in a scanning tunneling microscope. Beam 12 and tip 14 may be integrally manufactured or separately manufactured according to any of the probe designs and methodologies now known in the art or later devised. How the probe tip and cantilever beam are fabricated is only incidental to the invention and therefore will not be further detailed.

A conducting film 16 is then disposed on probe tip 14 and at least a portion of the underside of beam 12 and on tip 14. For example, beam 12 and probe tip 14 may be comprised of silicon nitride and fabricated to the shape shown in FIG. 1 using convention microlithographic processes. Tip 14, in particular, is typically defined by forming an etch pit in a crystalline substrate with an anisotropic etchant. Certain crystalline planes are preferentially etched, ultimately resulting in a four sided pyramidal etch pit in the substrate. Again the exact shape of tip 14 is incidental to the teaching of the invention other than being characterized by a sharp point with a high radius of curvature. A reinforced needle-like tip could be as consistent with the teachings of the invention as a pyramidal tip of some form. The silicon nitride or other material is then disposed on the substrate and into the etch pit. The underlying substrate, which has thus acted as a mold, is then etched away leaving probe 10 comprised of beam 12 and tip 14. Thin metallic film 16 is then disposed by any means desired onto probe 10.

In the preferred embodiment, the silicon nitride cantilever beam 12 and tip 14 have a thin titanium binding layer 16 first disposed on probe 10. Titanium layer may typically be between 60 to 100 angstroms thick. Thereafter, a conducting film 18 is disposed on the binding layer 16. Again, in the preferred embodiment, conducting film 18 is comprised of a noble metal, or more particularly gold, and may be of 3 to 800 angstroms thicks.

Probe 10 is then brought into the near proximity of a flat, electrically conducting sample substrate 20. A voltage pulse as described below is then applied between sample substrate 20 and probe 10 by circuit 22. A self-limiting hole 24 is then voltaicly formed into conducting film 18 leaving a nanometer-sized hole or sensor area at the end of tip 14 which can be repeatedly defined without difficulty.

The distance between tip 14 and the surface of conducting sample substrate 20 is controlled and monitored by the particular physical interaction selected to provide the relationship between sample substrate 20 and probe 14. In this manner, the physical distance of separation between tip 14 and sample substrate 20 can be very accurately and repeatedly controlled. For example, in an atomic force microscope, the tip-to-sample force is controlled so that the force is maintained in the nanonewton range as determined by the degree of deflection of beam 12. In the preferred embodiment the tip-to-sample distance is of the order of 1 angstrom. Once the distance between tip 14 having conducting film 18 disposed thereon and sample substrate 20 is set, a voltage pulse is applied from source 22 between conducting film 18 and conducting substrate 20. Due to the sharpness of probe tip 14, the electric field is highest near the apex of tip 14. For example a 1 volt square wave pulse produces an electric field strength of the order of 109 to $10^{10}$ volts per meter. Under such high electric field strengths, conducting film 18 on probe tip 14 evaporates and deposits on the surface of sample substrate 20. By this means, hole 24 is opened up in metal film 18.

Every metal has a threshold electric field, $E_{th}$, which must be exceeded before evaporation takes place. For a particular tip-to-sample voltage, the electric field near the tip may exceed this threshold and therefore metal evaporation can occur. However, the field strength decreases rapidly as one moves away from the apex of tip 14, since the distance between the apex and the sample increases. Beyond a certain radius from the apex of tip 14, the electric field falls below the threshold and no evaporation occurs. Hence, the border of hole 24 is self-limiting and repeatably defined by Eth, the tip shape at the apex and the electric field gradient in which the tip is placed. This parameters are repeatable from one probe to another with a high degree of accuracy.

The radius of hole 24 thus corresponds to the location of the threshold field on film 18 which in turn is controlled by the voltage applied to tip 14 from source 22 as well as the sharpness of tip 14. Higher voltages and blunt tips produce larger holes, whereas lower voltages and sharp tips produce smaller holes.

In the atomic force microscope probe described above in connection with FIGS. 1–3, fabricated of silicon nitride, holes of the order of 50 to 200 nanometers can be repeatedly manufactured in gold films deposited on probe 10. It is thus to be expressly understood that although the illustrated embodiment is described in terms of an atomic force microscope probe, any type of sensor in which a reliably or repeatedly defined tip hole is an operative part may employ the method of the invention to advantage. It is presently contemplated that scanning tunneling microscope as well as near-field optical probes will be able to immediately use the nanofabrication technique of the invention with profit.

The making of a nanometer-scale hole in a sharp tip 14 is the first step in making a completed sensor. Note in connection with FIG. 3 that typically due to small imperfections, the apex of pyramidal tip 14 does not define a point. While theoretically the triangular surfaces of tip 14 should each meet at a point, this is often not the case. Instead, the apex of tip 14 will be a dihedral angle between two opposing surfaces and hence give rise to a rectangular shape for hole 24 as opposed to a square one. Hole 24 may even be trapezoidal since often the opposing triangular surfaces of the tip are not symmetric. In some cases, one triangular surface may be more inclined than the opposing surface and therefore provide a more gentle slope, hence giving rise to a trapezoidally shaped hole 24.

Figure 4:
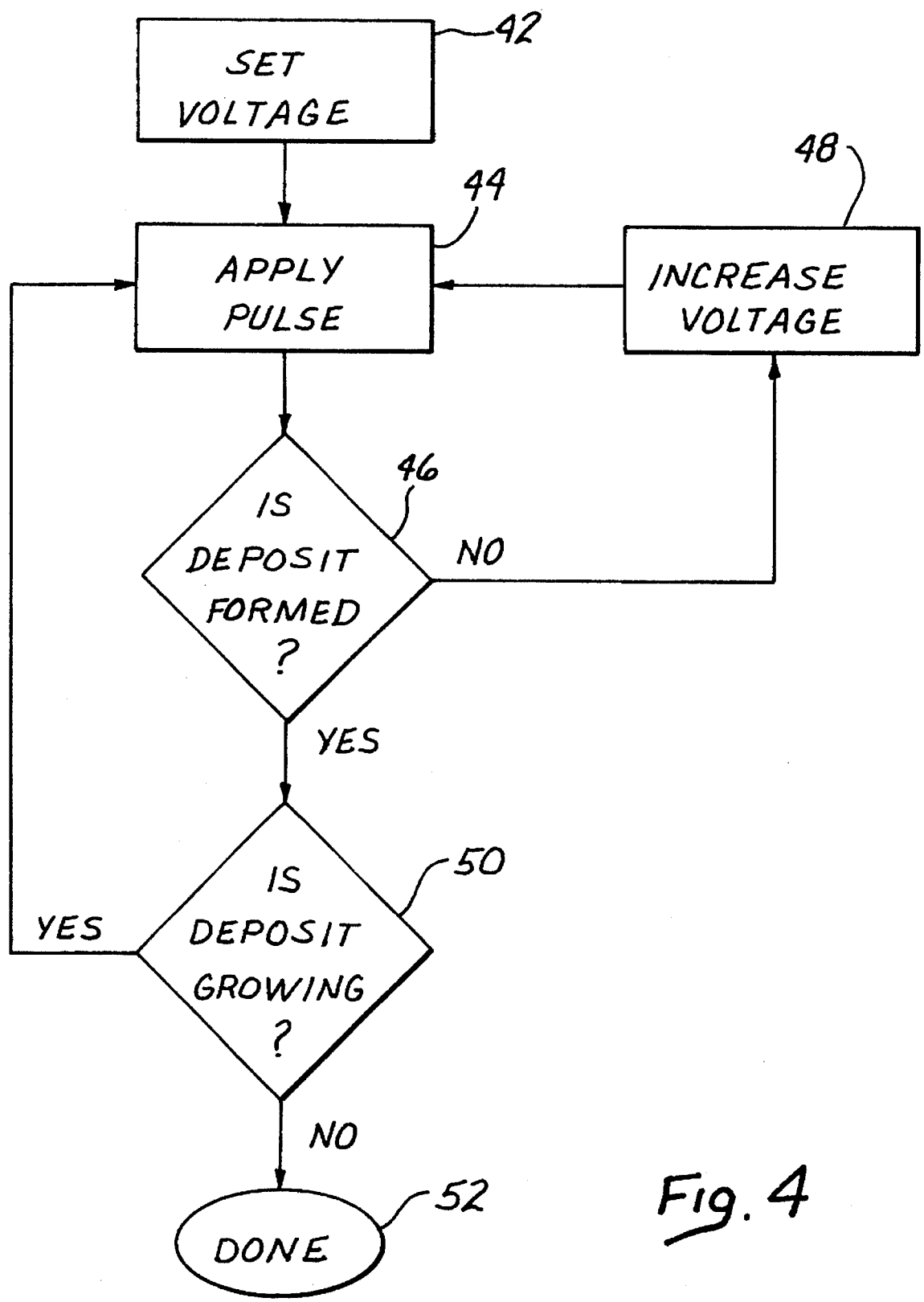
FIG. 4 is a flow chart depicting the basic steps of the methodology of the invention.

FIG. 4 is a flow diagram which illustrates the methodology practices in each of the embodiments of the invention. The process begins at step 42 in which the voltage applied between substrate 20 and probe 10 is set. This voltage may be initially set below one volt and is typically set between 0.5 and 1.0 volt. At step 44, a square wave voltage or other shaped envelope is applied between the conductive layer disposed on probe 10 through which a hole is being formed and sample substrate 20. A test is then made at step 46 to determine whether or not evaporation has occurred and deposition of the metal or other material has been made onto sample substrate 20. Probe 10 itself is used as an atomic force scanning probe to determine if such deposit is formed. If no deposit is formed, then the voltage is increased at step 48, and a higher voltage pulse applied again at step 44 as before.

However, if a deposit is detected, then a determination is made at step 50 whether or not the deposit is increasing in size over the application of the last pulse during which there was a deposit on substrate 20, if any. If the deposit is continuing to grow in size as measured by probe 10, then the process returns to step 44 and a pulse again is reapplied at the then current voltage. The process continues and the deposition of metal or other material onto substrate 20 is monitored until the deposit ceases to grow by virtue of its self-limiting physics. After it is determined that self-limitation has been achieved, the process is terminated at step 52.

Consider the fabrication of an optical/atomic force scanning probe. In near-field optical microscopy, the scanning tip normally uses a tapered optical fiber with a metal coating on top and a nanometer-scale hole in the metal coating at the end of the tapered fiber tip. By scanning this probe across a surface, surface features smaller than the wave length of the reflected light can be optically imaged into the fiber. However, the problem which such fiber optic probes is that the probe tips are extremely fragile and often break. In addition, the light transmitting efficiency is sometimes unacceptably low.

Figure 2:
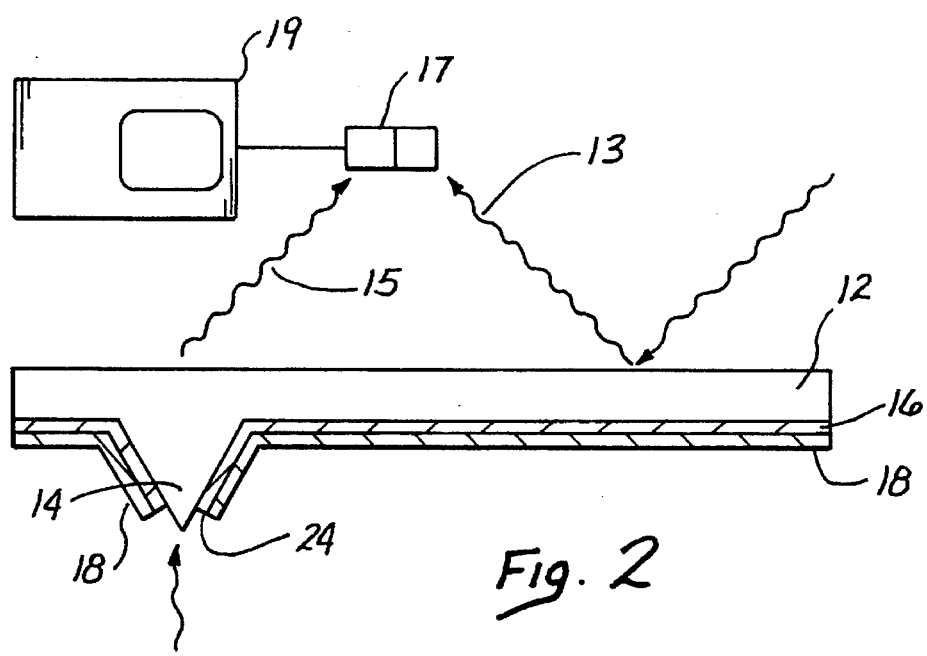
FIG. 2 is a simplified diagrammatic side view of the probe of FIG. 1 after it has been subjected to the fabrication technique of the invention.

By using a nanofabrication process as illustrated in FIGS. 1–3, holes 24 can be made in metal films 18 in standardized and commercially available silicon nitride probes as are currently extensively used in atomic force microscopes. These probes are of a design which are very rugged and have sensing characteristics which are very well characterized. The taper angle of probe tip 14 is such that the optical transmission efficiency is higher than in an optic fiber and the silicon nitride material of probe tip 14 can itself be utilized in place of the optical fiber. In such a probe tip then simultaneous scanning of a sample surface can then be made using both atomic force and near-field optics as the scanning relationship from which a microscopic image can be formed. The two sensed signals 13 and 15, namely the reflected beam signal 13 which is an atomic force microscopic signal, and the transmitted probe tip signal 15 which is a near-field optical signal transmitted through hole 24 of tip 14 from the sample, can thus be simultaneously read by detector assembly 17 shown diagrammatically in FIG. 2. These two signals 13 and 15 can be combined by a scanning computer 19 to provide a calculated two parameter image or a cross-correlated image of a sample.

Figure 5A:
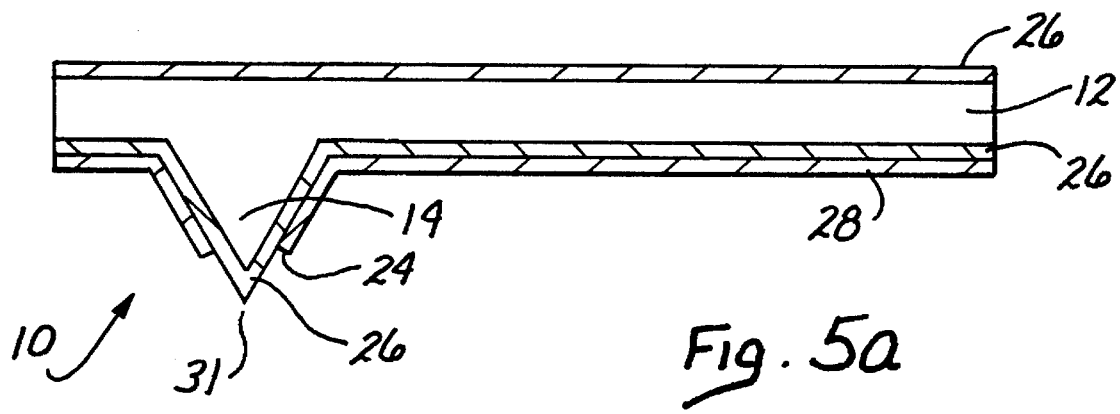
FIG. 5a is a simplified side cross sectional view of an alternative embodiment of a probe devised according to the present fabrication shown at a first intermediate state of completion.

Hole 24 in conducting film 18 can also be used as a mask for subsequent selective etching steps used in the fabrication of other kinds of sensors. For example, consider a doped silicon atomic force microscopic probe 10 on which an oxide film 26 has been grown or deposited by conventional means and processes as depicted in the simplified side cross-sectional view of FIG. 5a. A thin metal film 28 is then deposited on oxide film 26 or at least on its bottom surface and a hole 24 evaporated in metal film 28 at apex 32 of tip 14 leaving the apex 31 of oxide layer 26 exposed as shown in FIG. 5a.

Figure 5B:
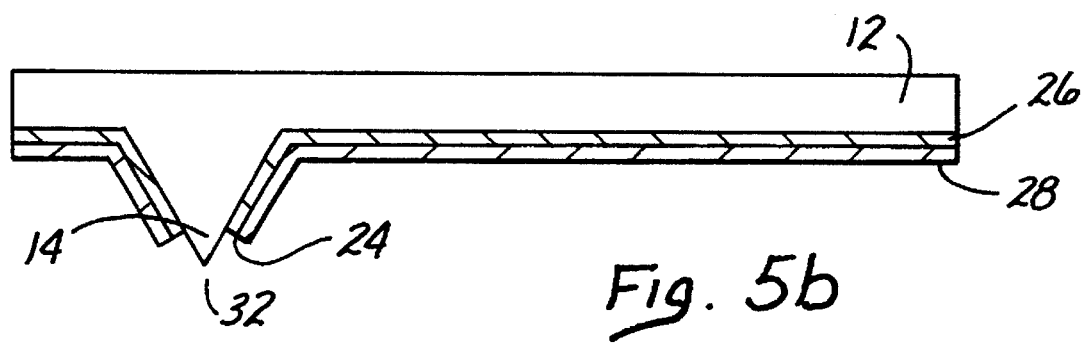
FIG. 5b is the probe of FIG. 5a after it has been subject to a selective oxide etching to expose the apex of the tip.
Figure 5C:
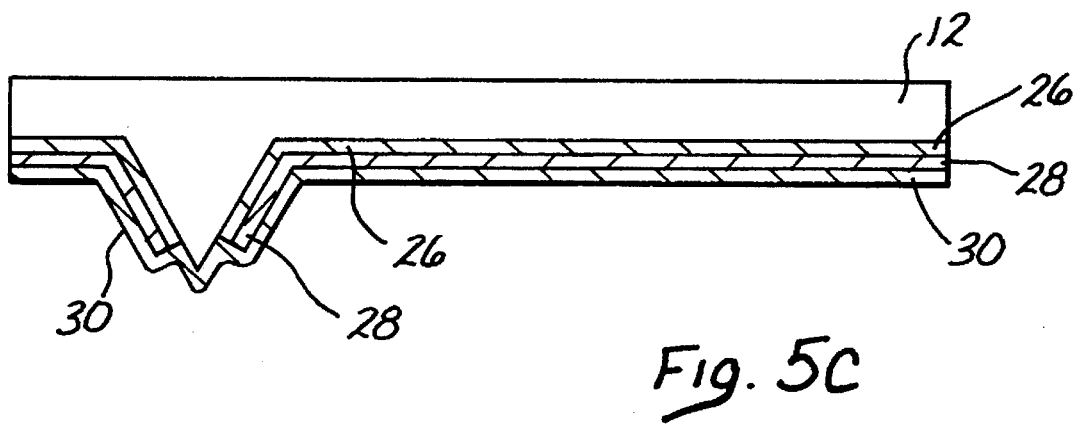
FIG. 5c is the probe of FIGS. 5b after a metal film deposition by which a Schottky diode is formed.

Again, thin metal film 28 may in fact be comprised of a binding layer of a first metal such as titanium followed by a second conductive layer, such as gold. Throughout the balance of the specification it is to be understood that wherever the deposition of a metal layer is discussed it may include the deposition of a composite metal layer comprised of a binding layer and the second layer. Metal film 28 in the form as shown in FIG. 5a then serves as a mask for oxide layer 26 which can be selectively etched by conventional means to expose apex 32 of the silicon nitride tip 14 as shown in FIG. 5b. Once oxide layer 26 is etched away a bare silicon nitride apex 32 of tip 14 is exposed and a second metal film 30 can then be deposited to form a Schottky diode as shown in FIG. 5c. It is well established that Schottky diodes can be used as temperature or optical sensors.

Therefore, the probe of FIG. 5c can be used simultaneously for temperature sensing, optical sensing, and as an atomic force microscope probe in a manner analogous to that described in FIG. 2. Still further, the device of FIG. 5c may again be subject to voltage pulsing in the same manner as described in connection with FIGS. 1–3 to define a second hole through the oxide and metal layers if additional sensor structure is desired.

Figure 6A:
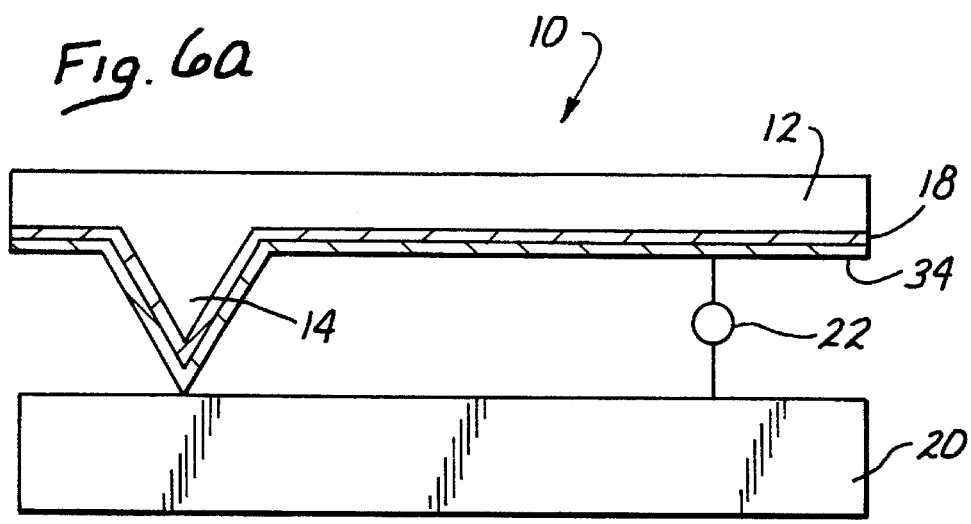
FIG. 6a is a simplified side cross sectional view of a partially fabricated thermocouple sensor.
Figure 6B:
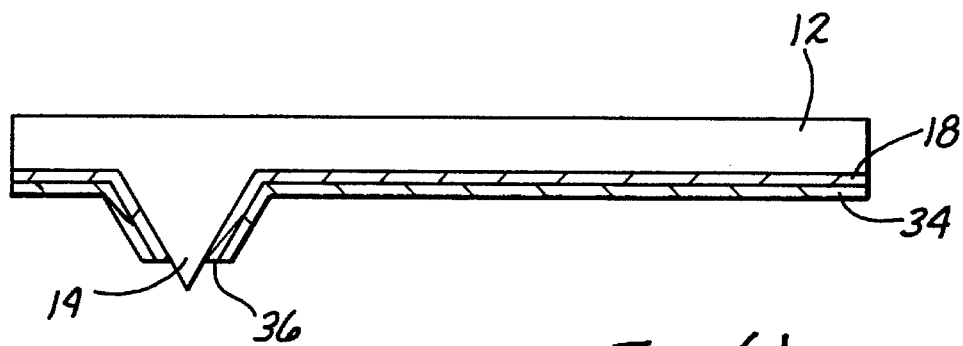
FIG. 6b is the probe tip of FIG. 6a after a hole has been defined in the tip defined of metal A and a second metal, metal B, is deposited.
Figure 6C:
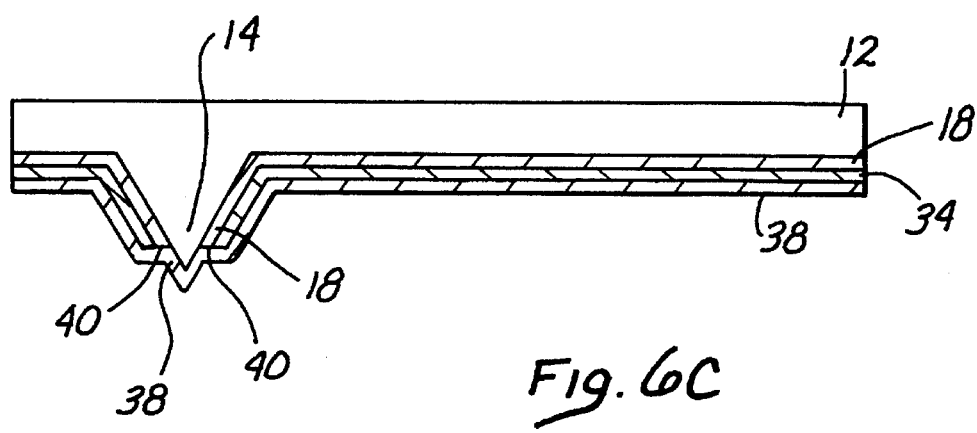
FIG. 6c is the completed thermocouple junction formed by the process illustrated in FIGS. 6a and 6b.

FIGS. 6a–c illustrates another sensor made from the methodology of the invention. In FIG. 6a, probe 10 has a metal film 18 disposed thereon as described in connection with FIG. 1 followed by disposition of an oxide layer 34 disposed on metal film 18. Once again, a hole 36 is voltaicly defined through the oxide layer 34 and metal layer 18 at the same time thereby defining hole 36 as shown in FIG. 6b. A second metal is then deposited on probe 10 to make a bimetal thermocouple junction at the end of the probe tip 14 as shown in FIG. 6c which can be used as a combined scanning thermal microscope and atomic force microscope with the thermocouple junction being formed between the contacting interface 40 of metals 18 and 38.

Figure 7A:
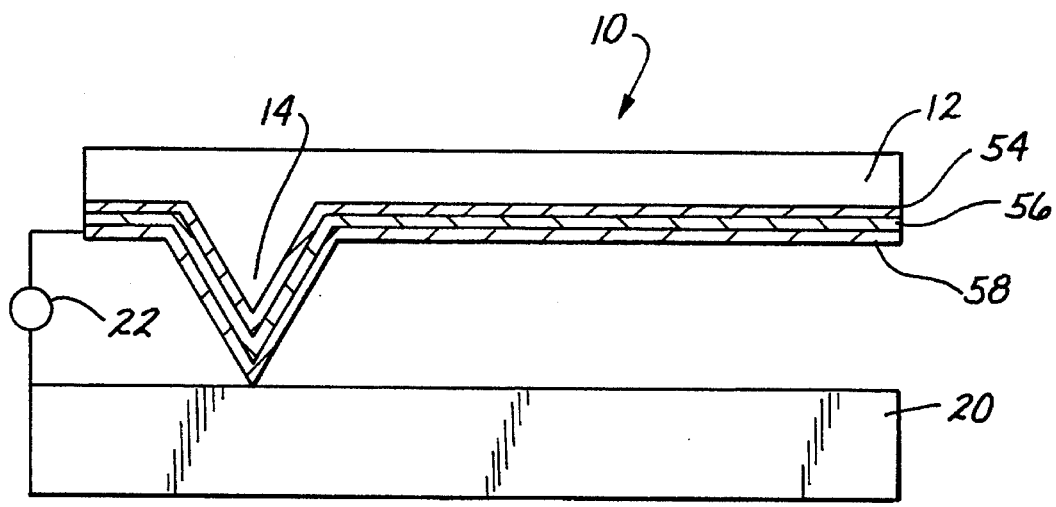
FIGS. 7a–c are simplified cross sectional side views of another embodiment of the methodology of the invention by which a metal-to-metal thermocouple junction may be fabricated.
Figure 7B:
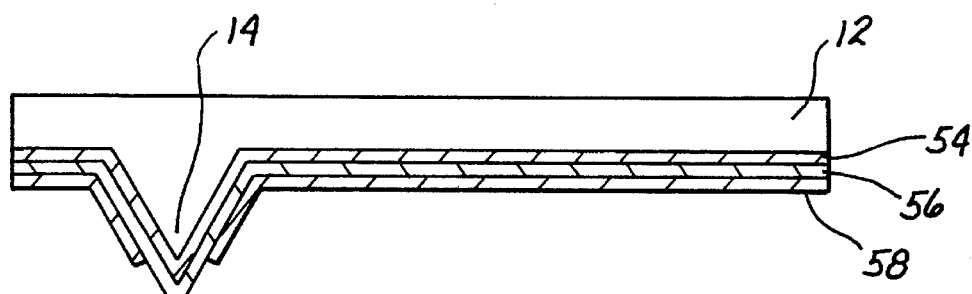
Figure 7C:
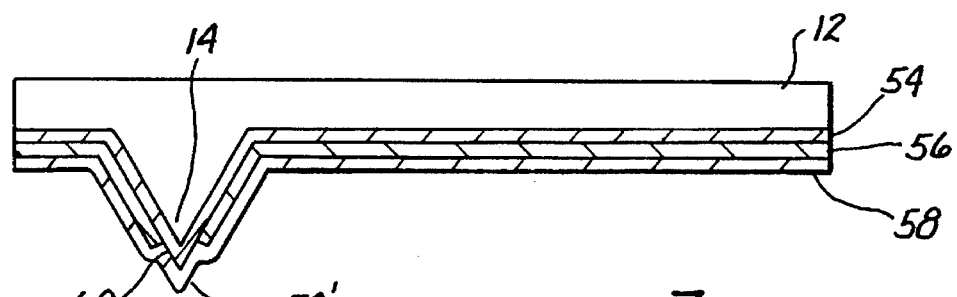

Another embodiment of the thermocouple sensor is shown in the process of FIGS. 7a–c. As in the case of the process of FIG. 6a–c, probe 10 has a first metal layer 54 disposed thereon, after which an oxide layer 56 is grown or otherwise formed on metal layer 54. Second metal layer 58 is then disposed on oxide layer 56, resulting in the structure shown in FIG. 7a. A voltage pulse is then applied between the metal layer 58 of probe 10 and substrate 20. A defined hole is then blown or evaporated through metal layer 58 so that layer 58 can then serve as a mask for the exposed portion of oxide layer 56. Exposed oxide layer 56 is then removed through conventional means such as ion etching and the second metal again vapor deposited to form a layer 58' to form a two metal thermocouple junction 60 on the apex of tip 14 as shown in FIG. 7c.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result.

In addition to the equivalents of the claimed elements, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. An improvement in a method for forming a sensor comprising:

providing a probe with a pointed tip having an apex;

disposing a first conductive layer on said probe and on said tip of said probe;

disposing said tip of said probe a predetermined distance away from a conductive substrate; and applying a voltage pulse between said conductive substrate and said first conductive layer disposed on said tip of said probe, said voltage pulse having a magnitude above a predetermined threshold voltage to thereby evaporate a portion of said first conductive layer from said apex of said tip and to define a hole in said first conductive layer at said apex of said tip, whereby a modified probe structure usable as or in the fabrication of a sensor is reliably and repeatedly fabricated.

2. The improvement of claim 1 where applying said voltage to said first conductive layer comprises first applying a voltage pulse below said threshold voltage, determining whether said first conductive layer has been partially evaporated onto said conductive substrate, and if not, increasing the magnitude of said applied voltage until at least a portion of said first conductive layer on said apex of said tip is deposited on said conductive substrate.

3. The improvement of claim 2 further comprising terminating the application of said voltage to said first conductive layer when determination of deposition of said portion of said first conductive layer on said conductive substrate indicates that said deposition has self-limited.

4. The improvement of claim 1 where disposing a first conductive layer on said probe comprises disposing a binding layer on said probe and tip and then disposing a second conductive layer on said binding layer so that adhesion of said second conductive layer to said probe and tip through said binding layer is improved, said first conductive layer being comprised of said binding layer and said second conductive layer.

5. The method of claim 1 where prior to disposing said first conductive layer on said probe and tip, further comprising disposing an oxide layer on said probe and tip, and where said hole is defined in said first conductive layer to expose a portion of said oxide layer at said apex of said tip, and thereafter further comprising selectively removing said exposed portion of said oxide layer to selectively expose a portion of said tip, said tip being comprised of a semiconductor material, disposing a metal layer on said exposed portion of said tip to form a Schottky diode between said semiconductor material of said tip and said metal layer.

6. The method of claim 1 further comprising:

disposing an oxide layer on said first conductive layer prior to applying said voltage to said first conductive layer to define a hole through said oxide layer and said conductive layer; and disposing a second conductive layer of a selected metal on at least an exposed portion of said first conductive layer an said oxide layer to form a thermocouple junction between said first conductive layer and second conductive layer.

7. The method of claim 1 wherein said probe is comprised of an optically transmissive material and where said improvement further comprises providing an optical detector for receiving light through said tip of said probe through said hole defined in said first conductive layer to provide a near-field optical sensor.

8. The improvement of claim 1 where after disposing said first conductive layer on said probe, further comprising;

forming an oxide layer on said probe and tip;

disposing a second conductive layer on said oxide layer and hence on that portion of said probe and tip covered thereby;

applying a voltage between said second conductive layer and said substrate thereafter to define a hole in said second conductive layer to selectively expose a portion of said oxide layer;

removing said selected portion of said oxide layer to selectively expose a portion of said first conductive layer; and disposing a metal layer at least on said selectively exposed first conductive layer to thereby define a thermocouple junction therebetween.

9. The improvement of claim 5 further comprising using said probe as a sensor both for atomic force microscopy and scanning thermal or nearfield optical microscopy.

10. The improvement of claim 6 further comprising using said probe as a sensor both for atomic force microscopy and scanning thermal microscopy.

11. The improvement of claim 8 further comprising using said probe as a sensor both for atomic force microscopy and scanning thermal microscopy.

12. The improvement of claim 7 further comprising using said probe as a sensor for atomic force microscopy and for scanning near-field optical microscopy.

13. The improvement of claim 1 further comprising using said probe as a sensor for both atomic force microscopy and scanning tunneling microscopy.

14. An improvement in a sensor comprising:

a probe having a sharp tip with an apex;

a conductive layer disposed on said probe and tip; and a hole defined in said conductive layer at said apex of said tip by self-limiting evaporation of a portion of said conductive layer at said apex at said tip, whereby said sensor is fabricated with a high degree of uniformity and repeatability in size of said hole.

15. The improvement of claim 14 wherein said conductive layer is comprised of a binding layer disposed on said probe and tip and a metallic layer disposed on said binding layer so that adhesion of said conductive layer to said probe is improved.

16. The improvement of claim 15 wherein said binding layer is titanium and said metallic layer is a noble metal.

17. The improvement of claim 14 wherein said probe is composed of semiconductive material and further comprising a metallic layer disposed in said hole in contact with exposed portion of said probe to form a Schottky diode at said apex of said tip.

18. The improvement of claim 14 further comprising an oxide layer disposed on said conductive layer and wherein said hole is defined through said conductive layer and said oxide layer to selectively expose a portion of said apex of said tip, and a metal layer being disposed in said hole in contact with said first conductive layer to form a thermocouple junction therebetween.

19. The improvement of claim 14 further comprising an oxide layer exposed beneath said conductive layer and a metal layer disposed beneath said oxide layer and said conductive layer wherein said hole is defined in said conductive layer and in said oxide and thereafter said hole is refilled to reform said conductive layer therein and to form a thermocouple junction between said conductive layer and a portion of said metal layer exposed by said hole defined in said oxide layer lying between said first conductive layer and metal layer.

20. The improvement of claim 14 wherein said probe is comprised of a material which is light transmissive so that said tip of said probe, as selectively exposed by said hole through said conductive layer, functions as a near-field optical scanning sensor.

* * * * *